United States Patent [19]

Steudel

[11] 4,160,975
[45] Jul. 10, 1979

[54] CORRECTION CIRCUIT FOR WIDE BANDWIDTH ANTENNA

[75] Inventor: Fritz Steudel, Sudbury, Mass.

[73] Assignee: Raytheon Company, Lexington, Mass.

[21] Appl. No.: 919,596

[22] Filed: Jun. 27, 1978

[51] Int. Cl.² .......................... G01S 3/32; G01S 9/22; G01S 3/80
[52] U.S. Cl. ............................... 343/16 M; 340/6 R; 340/16 R; 343/100 SA
[58] Field of Search .......... 343/16 M, 113 R, 100 SA, 343/854; 340/16 R, 6 R

[56] References Cited
U.S. PATENT DOCUMENTS 3,794,998  2/1974  Pearson, Jr. et al. ............. 343/16 M

OTHER PUBLICATIONS

M. I. Skolnik, Introduction to Radar, 1962, pp. 297–299, McGraw-Hill, Inc.
D. K. Barton and H. R. Ward, Handbook of Radar Measurement, pp. 18–19, Prentice-Hall, Inc. 1969.

Primary Examiner—Maynard R. Wilbur
Assistant Examiner—Richard E. Berger
Attorney, Agent, or Firm—David M. Warren; Joseph D. Pannone; Milton D. Bartlett

[57] ABSTRACT

In a radar system employing an array antenna and microwave circuitry coupled thereto for developing sum and difference signals, a correction circuit utilizes the sum and difference signals for providing increased accuracy to elevation and azimuthal angle measurements of wide bandwidth radar signals. A correction is applied to the difference signal by subtracting therefrom a weighted time derivative of the sum channel, the weighting being proportional to the boresight error slope and the sines of the elevation and azimuth angles.

4 Claims, 7 Drawing Figures

$$a = d \sin \theta_2; \psi_a = \frac{a}{\lambda_2}(2\pi) = (\frac{d}{\lambda_2})(2\pi)\sin\theta_2$$
$$b = d \sin \theta_1; \psi_b = \frac{b}{\lambda_1}(2\pi) = (\frac{d}{\lambda_1})(2\pi)\sin\theta_1$$

CORRECTION CIRCUIT FOR WIDE BANDWIDTH ANTENNA

BACKGROUND OF THE INVENTION

Radar systems typically employ antennas that are many times larger than a wavelength of a radar signal transmitted or received by the antenna. An exemplary antenna is a phased array antenna which is composed of numerous radiating elements to provide a narrow beam of radiation, the elements being spaced apart by approximately one-half the nominal wavelength of the radar signal. Signals received by the various radiating elements are combined, as in a monopulse radar, to provide a sum channel signal and a difference channel signal for measurements of elevation and azimuth angles of a radar signal incident upon the antenna. A similar combination of signals takes place in a sonar system employing an array of sonic radiating elements, or transducers, in which a difference channel signal is utilized as in a radar system for indicating the direction of incident radiation relative to the direction at which the transducer array is directed.

The beam produced by the radar antenna is steered by phase shifters coupled to each of the radiating elements. While delay lines may also be used at microwave frequencies, at the present time, the cost and attenuation of such delay lines are excessive so that, generally, only the phase shifters are used. In the case of sonar systems wherein the sonic radiation is of a much lower frequency than the electromagnetic radiation, either phase shifters or delay lines may be utilized for steering the beam, the latter providing a steering capability which is independent of the radiation frequency.

A problem arises in the case of the array antenna utilizing the phase shifters to steer a beam of radiation having a frequency which is variable or wherein several frequency components of the radiated signal are present over a relatively wide bandwidth. A set of phase angles imparted by the phase shifters for steering the beam is present for one value of the radiation frequency with the result that a phase error is present for other values of the radiation frequency. The phase error increases with increasing distance from the center of the antenna, and with increasing frequency offsets from the nominal frequency of the radiation. Noticeable degradation of the radiation pattern of the antenna with attendant diminution in the accuracy of the angle measurements occurs when the bandwidth of the radiated signal is sufficiently wide to introduce phase errors on the order of 30° at the radiating elements near the edge of the array.

SUMMARY OF THE INVENTION

The foregoing problem is overcome and other advantages are provided by a system for measuring the angle of orientation of a beam of radiation relative to an array antenna of the system, radiating elements of the antenna being coupled to phase shifters which impart a phase shift to signals transmitted or received by individual elements of the array antenna. The system includes circuitry coupled to the antenna and the phase shifters for combining signals of the respective elements to provide a sum channel signal and a difference channel signal for use in the measurement of the angle of orientation of the radiation beam.

In accordance with the invention, a correction circuit is coupled between the sum and difference channels for correcting an error in the difference signal resulting from frequency components of a radiated signal incident upon the array, which frequency components are offset from the value of a nominal frequency to which the phase shifters have been set. The correction circuit incorporates a differentiator for forming the time derivative of the sum signal, and a multiplying circuit for weighting the value of a derivative by a complex number having a phase angle of 90° and a magnitude proportional to the boresight error slope and the sine of the angle of orientation of a beam axis to which the antenna has been steered by the phase shifters. The resulting weighted value of the derivative of the sum signal is then subtracted from the difference signal thereby correcting the difference signal from the effects of frequency components of the radiated signal offset from the nominal design frequency of the delay and phase shifters.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
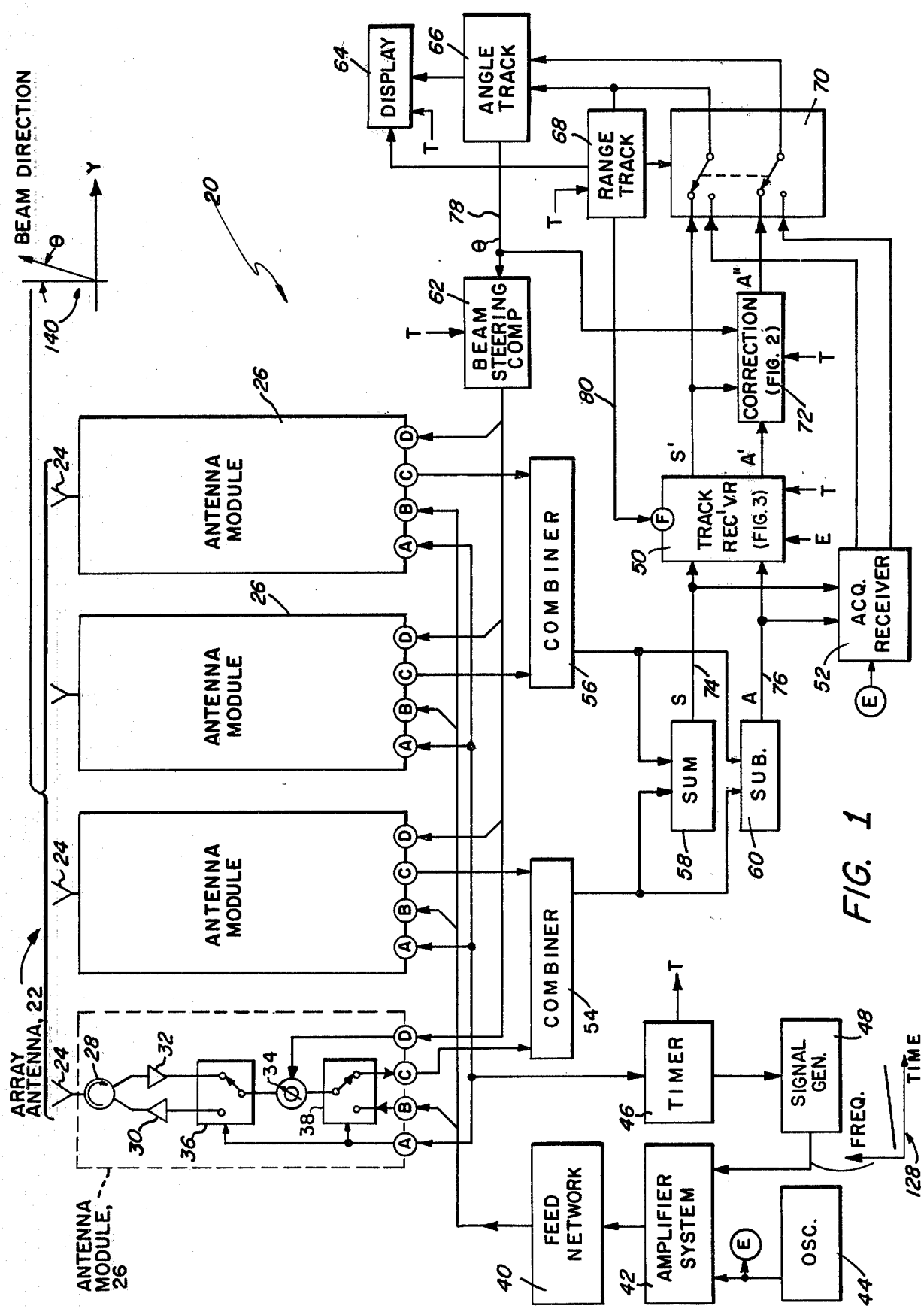
FIG. 1 is a block diagram of an exemplary radar system incorporating the array antenna and phase shifters and including the correction circuit of the invention.

Referring now to FIG. 1, there is seen a block diagram of a target tracking system 20 which tracks the angle of orientation of a beam of incident radiation such as that of a radar signal or sonar signal radiated toward the system 20 from a distant target (not shown). The system 20 includes an antenna 22 composed of an array of radiating elements 24. For convenience in describing the invention, it will be assumed that electromagnetic radiation signals are incident upon the antenna 22. However, it is understood that the invention is also applicable to a sonar situation in which case the radiating elements 24 would be fabricated as sonar transducers.

A set of antenna modules 26 is provided for coupling electrical signals to the antenna 22 with individual ones of the modules 26 being coupled to respective ones of the elements 24. The components of the module 26 at the left side of the antenna 22 are shown in the Figure, it being understood that the other modules 26 contain the same components. Each module 26 is seen to comprise a transmit/receive circuit in the form of a circulator 28 coupled between a radiating element 24 and two amplifiers 30 and 32 wherein the amplifier 30 is a power amplifier for amplifying a radar signal to a suitable amplitude for transmission from the radiating element 24 while the amplifier 32 is a preamplifier for amplifying radar echo signals received at the element 24. Signals from the amplifier 30 are coupled via the circulator 28 to the element 24 while signals incident upon the element 24 are coupled via the circulator 28 to the amplifier 32. A phase shifter 34 is coupled via a pair of switches 36 and 38 alternately to the amplifiers 30 and 32 so that signals from terminal B are coupled to the input terminal of the amplifier 30 while signals from the output terminal of the amplifier 32 are coupled to terminal C. By means of the switches 36 and 38, a single phase shifter, namely, the phase shifter 34, can be utilized for adjusting the phases of both a signal transmitted by the element 24 and a signal received by the element 24. The phase shifter 34 which, by way of example, may be a microwave phase shifter employing a set of diodes each of which is selectively energized to produce the requisite phase shift, is shown activated by a line from terminal D. The positions of the two switches 36 and 38 are controlled by a signal at terminal A. Thereby, upon activation of the signals at terminals A and D, the switches 36 and 38 are positioned for either transmitting or receiving signals from the element 24 while the phase shifter 34 is directed to impart the requisite phase to the signal coupled by the switches 36 and 38.

The system 20 further comprises the feed network 40, an amplifier system 42, an oscillator 44, a timer 46 and a signal generator 48 which are utilized for transmitting a signal from the antenna 22. In response to timing signals from the timer 46, the generator 48 generates a signal from transmission by system 20, the signal being coupled from the generator 48 to the amplifier system 42 which amplifies the signal to a suitable level for being distributed by the feed network 40 among the modules 26. The oscillator 44 provides a carrier signal upon which the signal of the generator 48 is modulated for transmission from the antenna 22. The amplifier system 42 includes a modulator (not shown) which is coupled to both the oscillator 44 and the generator 48 for modulating the carrier with the signal of the generator 48. The carrier signal of the oscillator 44 is also present at terminal E for use by a tracking receiver 50 and an acquisition receiver 52 which will be described subsequently in reference to the reception of echo signals. The carrier signal at terminal E is utilized by the receivers 50 and 52 for demodulation of the carrier to recover the baseband signal generated by the generator 48.

The system 20 further comprises combiners 54 and 56, a summer 58, a subtractor 60, a beam steering computer 62, a display 64, an angle tracker 66, a range tracker 68, a switch 70 as well as the aforementioned receivers 50 and 52, all of which are utilized in receiving and measuring signals incident upon the antenna 22. Also, a correction unit 72, which will be described hereinafter, is provided in accordance with the invention between the tracking receiver 50 and the angle tracker 66 for correcting a difference channel signal as provided by the subtractor 60 and the receiver 50 in a manner to be described.

Signals received via the elements 24 on the left side of the antenna 22 are coupled via the terminals C of the corresponding modules 26 to the combiner 54 wherein the signals are summed together and applied to one input terminal of the summer 58 and one input terminal of the subtractor 60. Similarly, the signals from the corresponding elements 24 of the right hand side of the antenna 22 are coupled via the corresponding modules 26 to the combiner 56 which sums together the signals and applies the sum to a second input terminal of the summer 58 and a second input terminal of the subtractor 60. The summer 58 produces a sum signal for the sum channel of the system 20 on line 74, the signal on line 74 being the sum of all the signals of the elements 24 with their corresponding phase shifts as applied by the corresponding phase shifters 34. The subtractor 60 produces the difference channel signal for the difference channel of the system 20 on line 76, the signal on line 76 being the difference between the sum of the signals of the right hand side of the antenna 22 minus the sum of the signals of the left hand side of the antenna 22.

Prior to the initiation of range tracking by the range tracker 68, the signals on the lines 74 and 76 are coupled via the acquisition receiver 52 and the switch 70 to the angle tracker 66. The acquisition receiver 52 provides filtering of the signals for the suppression of noise and amplification of the signals for operation of the angle tracker 66. The sum signal on line 74 indicates the presence of a radar target at an orientation relative to the antenna 22 corresponding to the angle ordered on line 78 by the angle tracker 66. For simplicity in describing the system 20, only one difference channel signal such as the signal on line 76 is provided, this signal corresponding to either an elevation angle or an azimuth angle. As is well known in the design of radar systems, two difference channel signals are provided for elevation and azimuth angles of target orientation for radar systems tracking in both azimuth and elevation.

The beam steering computer 62 provides a set of individual phase command signals on each of the lines seen fanning out from the computer 62 and into the D terminals of the respective modules 26. In a situation where only a relatively few steering angles are desired, the computer 62 may be replaced by a read-only-memory storing individual sets of phase commands with an individual set being addressed by the ordered beam direction on line 78. For the more general case where the antenna 22 has many elements and many beam pointing angles, such as an antenna comprising one thousand radiating elements and beam steering in increments of one degree, it is preferable to have the computer 62 compute the requisite phase angles in accordance with a well known formulation for each beam direction as ordered by the signal on line 78.

During the acquisition mode, the angle tracker 66 orders successive increments in the beam pointing angle on line 78 so that the radar beam is steered, for example, in azimuth for locating a target. The range tracker 68, in response to timing signals at terminal T from the timer 46, provides a range gate on line 80 to the tracking receiver 50 for tracking in range during each azimuthal position of the radar beam. When a target is detected at a specific beam angle and at a specific range, the range tracker 68 activates the switch 70 for coupling the angle tracker 66 to the correction unit 72 and the tracking receiver 50. Also, the range tracker 68, upon activation of the switch 70, is coupled to the tracking receiver 50 and disconnected from the acquisition receiver 52. Thereupon, the angle tracker 66 is responsive to the highly accurate difference channel signal, the difference channel signal having been corrected via the correction unit 72 in accordance with the invention, for incrementing or decrementing the angle command signal on line 78 for tracking a target in azimuth. The direction of the target and the range of the target are transmitted respectively from the angle tracker 66 and the range tracker 68 to the display 64 for presentation of this data.

The timer 46 provides synchronization of the transmission and receiving functions of the system 20. The advancement of the beam direction in acquisition is accomplished in response to the timing signals of the timer 46 applied to the angle tracker 66. In this way, the target tracking system 20 is seen to have a mode of operation similar to that generally in use by radar and sonar systems. With the correction unit 72, the foregoing operation is seen to be maintained, however, increased angle accuracy is obtained in the tracking of a target in accordance with the invention as will now be explained.

Figure 2:
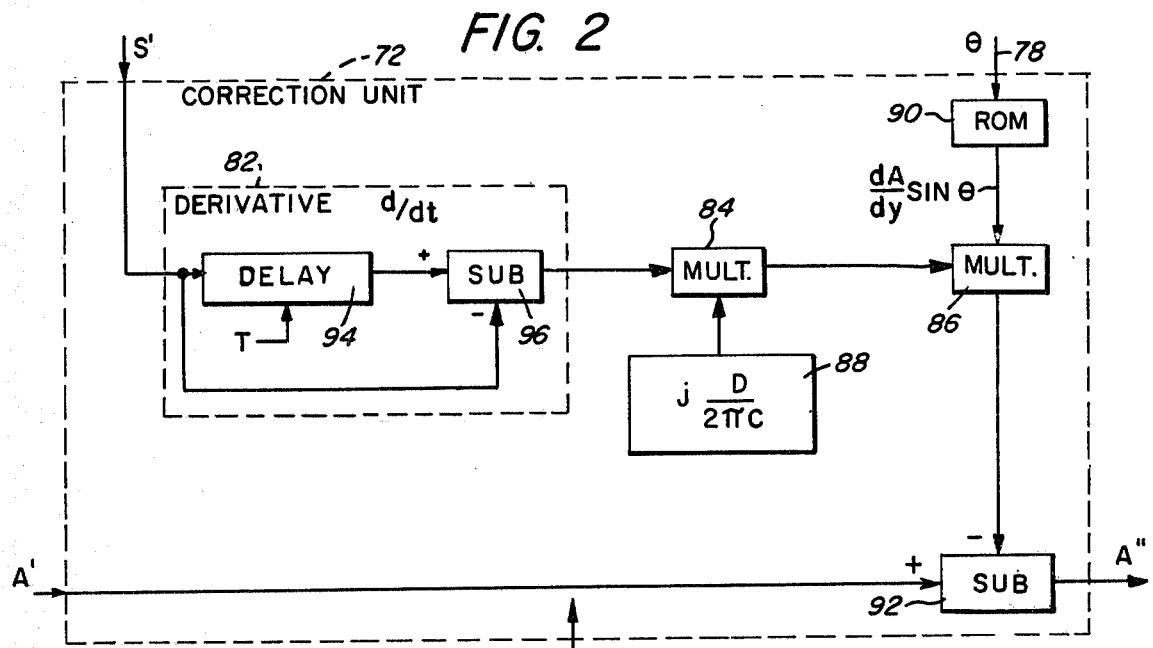
FIG. 2 is a block diagram of the correction circuit of FIG. 1.

Referring now to FIGS. 1 and 2, the invention provides increased angle tracking accuracy by removing errors in the difference channel signal which are caused by a wide bandwidth radar signal impinging on a phased array antenna wherein the phasing is accomplished by a set of phase shifters adjusted for radiation of a single frequency. The correction of the difference channel signal is obtained, in accordance with the invention by the insertion of the correction unit 72 between the tracking receiver 50 and the angle tracker 66. The correction unit 72 utilizes the sum signal of the tracking receiver 50 for correcting the difference signal of the tracking receiver 50.

The correction unit 72 is seen to comprise a derivative unit 82, multipliers 84 and 86, a source 88 of a complex digital number serving as a weighting factor, a read only memory 90 and a subtractor 92. The signals of the sum and difference channels are both in the form of complex digital numbers. The derivative unit 82 performs its operation by taking the difference between a sample of the sum signal and the next sample of the sum signal. The derivative unit 82 includes a delay unit 94 and a subtractor 96. The delay unit 94, in response to timing signals at terminal T, delays a sample of the sum signal by an interval of time equal to one intersample interval. For example, the delay unit 94 may comprise a multi-bit shift register having a sufficient number of bits to accommodate the digits of the real and the imaginary parts of a digital sample of the sum signal. The subtractor 96 then subtracts a sample of the sum signal from the previously occurring sample which has been provided by the delay unit 94. Since the time base for the time derivative of the sum signal is understood to be in units of the intersample interval, the output signal of the subtractor 96 represents the amount of change in the sum signal occurring during one intersample interval, that amount of change being equal to the rate of change of the sum signal in units of intersample intervals. Accordingly, the output signal of the subtractor 96 is equal to the time derivative of the sum signal. The derivative provided by the derivative unit 82 is then weighted in the multiplier 84 by a weighting factor of the source 88, the weighting factor being an imaginary number and having a magnitude proportional to the length, D, of the antenna 22 as will be explained subsequently in a mathematical description of the correction process.

The derivative is further weighted in the multiplier 86 by a weighting factor equal to the product of the boresight angle error slope (derivative of the difference signal, A) and the sine of the beam angle $\theta_1$, the weighting factor being provided by the memory 90 in response to an addressing thereof and the angle command signal on line 78. The weighted derivative signal provided by the multiplier 86 is then subtracted in the subtractor 92 from the difference signal to produce a corrected difference signal. In the figures, the sum and difference signals are represented respectively by S and A. The sum and difference signals are further identified by primes, the primes indicating a filtering of the sum and difference signals by the tracking receiver 50. In addition, a double prime is utilized to identify the difference signal after it has been corrected by the correction unit 72.

Figure 3:
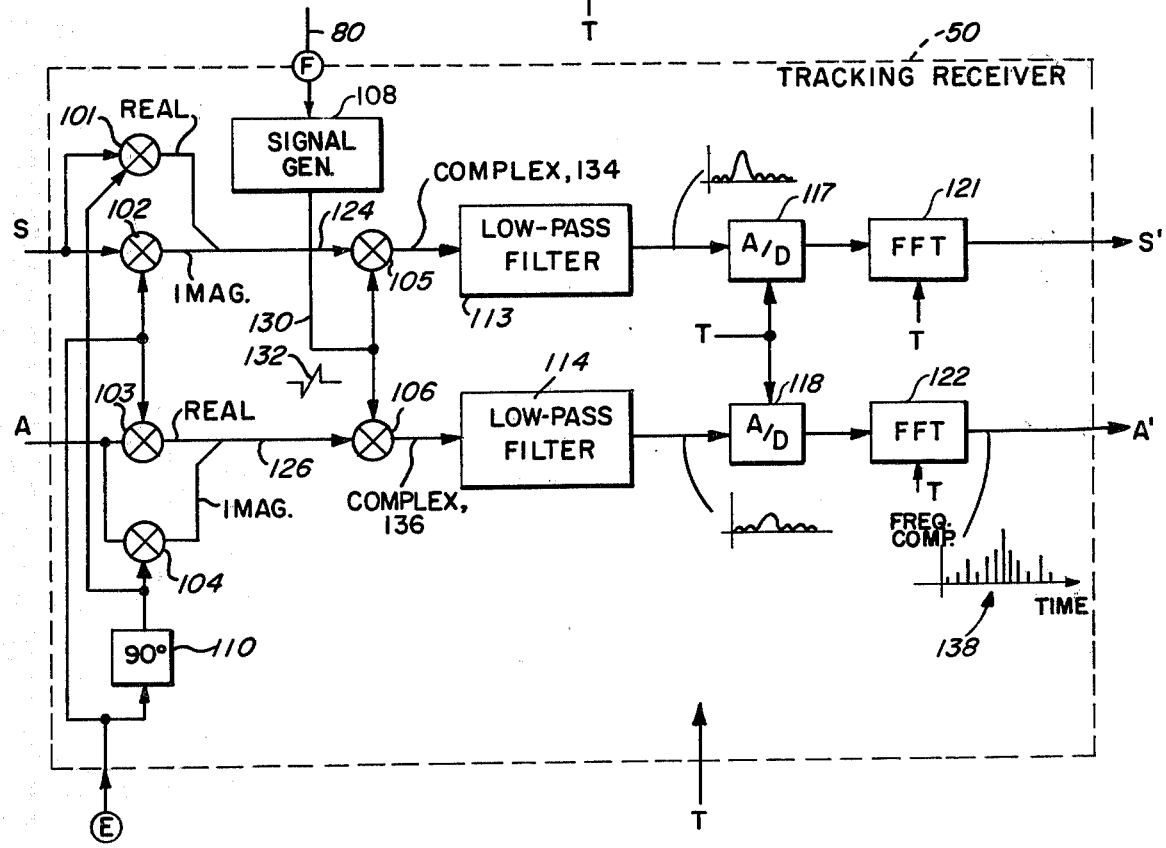
FIG. 3 is a block diagram of a tracking receiver of FIG. 1 for use with the correction circuit of FIGS. 1 and 2.

Referring now to FIG. 3, the tracking receiver 50 receives the sum and difference signals at the left-hand side of the figure in analog format and provides filtered sum and difference signals in digital format at the right-hand side of the figure. The tracking receiver 50 demodulates the carrier by use of inphase and quadrature carrier reference signals and further provides for a matched filtering of the received radar signal. The receiver 50 comprises six mixers 101–106, a signal generator 108, a 90° phase shifter 110, low pass filters 113–114, analog-to-digital converters 117–118, and digital fast Fourier transformers 121–122. The reference input terminals of the mixers 102 and 103 are coupled directly to the carrier signal at terminal E while the reference input terminals of the mixers 101 and 104 are coupled to terminal E via the phase shifter 110 to provide a quadrature reference signal for the mixers 101 and 104. The signal generator 108 is coupled via terminal F to the track gate signal on line 80 whereby the signal generator 108 is triggered in synchronism with the track gate signal of the range tracker 68 of FIG. 1. The converters 117–118 are strobed by timing signals at terminal T of the timer 46 of FIG. 1 at a rate at or, preferably greater than, the Nyquist rate of sampling the received analog signals.

The mixers 101 and 102 translate the sum signal from the microwave frequency region to the baseband frequency spectrum by mixing the sum signal with inphase and quadrature reference carrier signals. The output lines of the two mixers 101 and 102 are seen to fan into lines 124 which has inphase and quadrature components of the sum signal. Similarly, the mixers 103 and 104 translate the difference signal from the microwave spectrum to the baseband spectrum with the real and imaginary components of the signal appearing on line 126. The mixers 101–104 are understood to include output filters for rejecting higher harmonics of the mixing operation. The magnitude and phase of the complex signal on line 124 follow the magnitude and phase of the signal produced by the generator 48 of FIG. 1 and further include perturbations such as those associated with the Doppler effects of a moving target and multipath echo effects as are well known in radar. By way of example, the generator 48 provides a swept frequency modulation to the signal as shown in a graph 128 appended adjacent to the generator 48 in FIG. 1. The generator 108 of FIG. 3 produces the same swept frequency waveform 132 on line 130. The signal on line 130 is mixed with the signals on the lines 124 and 126 via the mixers 105 and 106 to produce signals on lines 134 and 136 which occupy the portion of the frequency spectrum at near zero frequency. In view of the complex representation of the signals on lines 124 and 126, it is understood that the drawing symbols for the mixers 105–106 each actually represent a pair of mixers for the inphase and quadrature components of the signals and, similarly, the line 130 from the generator 108 is understood to include inphase and quadrature reference signals to provide for the complex mixing operation to produce inphase and quadrature signals on each of the lines 134 and 136.

Each of the low pass filters 113–114 is understood to represent a pair of low pass filters, one for the real component and one of the imaginary component of the complex analog signals respectively on the lines 134 and 136. The low pass filters 113–114 have pass bands equal to the bandwidth of the signals on the lines 134 and 136 for removing any noise outside the signal spectra as well as harmonics of the mixing operations of the mixers 105–106. Similarly, the converters 117–118 are understood to each represent a pair of converters for converting the real and imaginary components of the analog signals respectively of the filters 113–114 to digital complex numbers which are then applied to the input terminals respectively of the transformers 121–122. As is well known, the Fourier transformers operate with complex digital numbers to produce a set of digital numbers each of which represents the magnitude and phase of frequency components of a set of signals to the input terminal of the Fourier transformer. The transformers 121–122 provide the output spectral lines serially as shown in a graph 138 appended to the transformer 122.

A feature of the magnitudes of the set of spectral lines shown in the graph 138 is the fact that it represents an envelope having the same shape as the envelope of a compressed pulse radar signal, this being equal to the response of a filter matched to the radar signal. The operation of the receiver 50 utilizing the multiplication in the mixers 105–106 by a matched reference signal on line 130 followed by the processing of the transformers 121–122 is sometimes referred to as stretched processing in the radar signal processing art. As a result, there appears at the sum and difference output signals of the tracking receiver 50 a matched filtered representation of the sum and difference signals applied to the input terminals of the receiver 50.

Referring also to the FIGS. 1 and 2, the complex digital representations of the filtered sum and difference signal, as has been described hereinabove, are then digitally processed by the correction unit 72 with the weighted derivative of the sum signal being subtracted from the difference signal. The complex digitally formated sum signal and the corrected digitally formated difference signal are then applied to the angle tracker 66 for providing the tracker 66 with a highly accurate difference signal for accurate measurement of the target position. The source of error and the manner of correction of the error will now be described with reference to a mathematical modeling of the system 20.

Mathematical Description of Tracking System With Error Compensation

Figure 4:
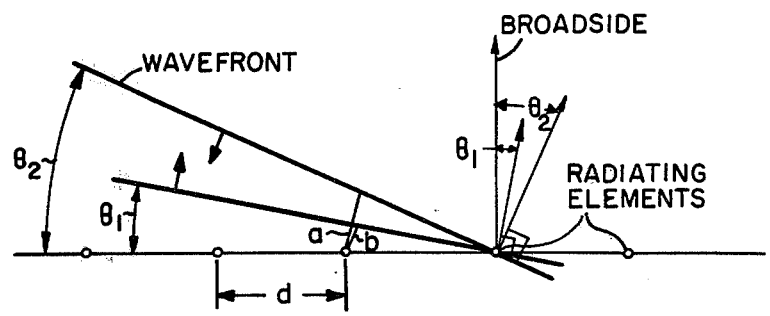
FIG. 4 is a diagram of an array of radiating elements of FIG. 1 showing angles of wavefronts.

Referring to the graph 140, shown appended to the radiating elements 24 of FIG. 1 and to the array of radiating elements of FIG. 4, the beam direction ordered by the angle tracker 66 is represented by the angle $\theta_1$. Since the phase shifters 34 of the system 20 provide for discrete increments of phase for a stepwise shifting of the beam to any one of a preset number of possible beam directions, it is understood that the target itself may lie at an angular orientation relative to the antenna 22 which is between two adjacent beam positions. In the following equations, the target angle will be represented by $\theta_2$.

The magnitude of the sum of the signals received by each of the elements of the antenna 22, wherein the elements are equally spaced along a straight line, is given by $$\left| \sum_{n=0}^{n=N-1} \sin(\omega t + n\psi) \right| = \frac{\sin(N\psi/2)}{\sin(\psi/2)} \quad (1)$$

in accordance with M. I. Skolnik, "Introduction to Radar Systems," McGraw-Hill Book Company, 1962, pages 297–299, where $\Psi = \Psi_a - \Psi_b$, $\Psi_a$ and $\Psi_b$ relate respectively to phase shifts introduced by incident radiation and by the phase shifters 34. $\Psi_a$ is the phase shift induced in one element relative to the next element of the antenna 22 in response to a wavefront of radiant energy incident upon the antenna 22 at an angle $\theta_2$ relative to the broadside direction. $\Psi_b$ is the increment in phase from one element to the next element introduced by the phase shifters 34. There is a total of N elements in the antenna 22, $\omega$ is the radian frequency, and t is time. The integer n increases monotonically from element to element showing a linear increase in the phase shifts from element to element.

With reference to FIG. 4, $\Psi_a$ may be expressed in terms of the angle $\theta_2$ at which the radiant energy is incident upon the array 22 by $$\Psi_b = 2\pi(a/\lambda_2) = 2\pi(d \sin \theta_2)/\lambda_2 \quad (2)$$

where a is the distance between the wavefront and the next element, d is the spacing between the elements, and $\lambda_2$ is the wavelength of the incident radiation. $\Psi_b$ may be expressed in terms of the angle $\theta_1$ of a beam formed by the antenna 22 by the relationship $$\Psi_b = 2\pi(b/\lambda_1) = 2\pi(d \sin \theta_1)/\lambda_1 \quad (3)$$

where $\theta_1$ is measured between a normal to the antenna 22 and the axis of the beam, b is the distance between a wavefront of the beam and the next element, and $\lambda_1$ is the wavelength of radiation transmitted by the antenna 22. Combining equations 2 and 3 provides $$\psi = \psi_a - \psi_b = 2\pi d \left( \frac{\sin \theta_2}{\lambda_2} - \frac{\sin \theta_1}{\lambda_1} \right) \quad (4)$$

The phase shift $\Psi$ may be expressed in terms of transmission frequency $f_1$ and reception frequency $f_2$ by substituting the relationship $\lambda f = c$, c being the speed of light, into equation 4 to give $$\Psi = 2\pi(d/c)(f_2 \sin \theta_2 - f_1 \sin \theta_1)$$

$$= 2\pi(d/\lambda_1)(f_2/f_1 \sin \theta_2 - \sin \theta_1) \quad (5)$$

Substituting equation 5 for $\Psi$ in equation 1 and using the relation that the length D of the antenna 22 equals Nd gives $$\left| \sum_{n=0}^{n=N-1} \sin(\omega t + n\psi) \right| = \frac{\sin\left[ \frac{\pi D}{\lambda_1} \left( \frac{f_2}{f_1} \sin \theta_2 - \sin \theta_1 \right) \right]}{\sin\left[ \frac{\pi D}{N\lambda_1} \left( \frac{f_2}{f_1} \sin \theta_2 - \sin \theta_1 \right) \right]} \quad (6)$$

Substituting $$y = (D/\lambda_1)(f_2/f_1 \sin \theta_2 - \sin \theta_1) \quad (7)$$

into equation 6 gives $$\left| \sum_{n=0}^{n=N-1} \sin(\omega t + n\psi) \right| = \frac{\sin[\pi y]}{\sin[(\pi/N)y]} \quad (8)$$

Figure 5:
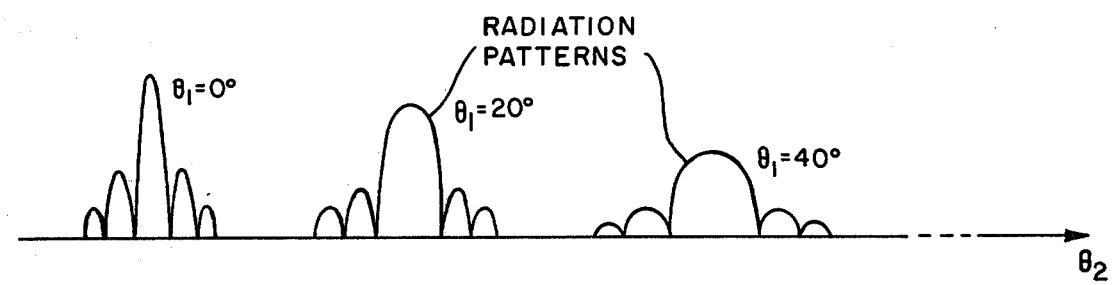
FIG. 5 is a stylized diagram of radiation patterns for the array of FIGS. 1 and 4 as a function of beam steering angle.
Figure 6:
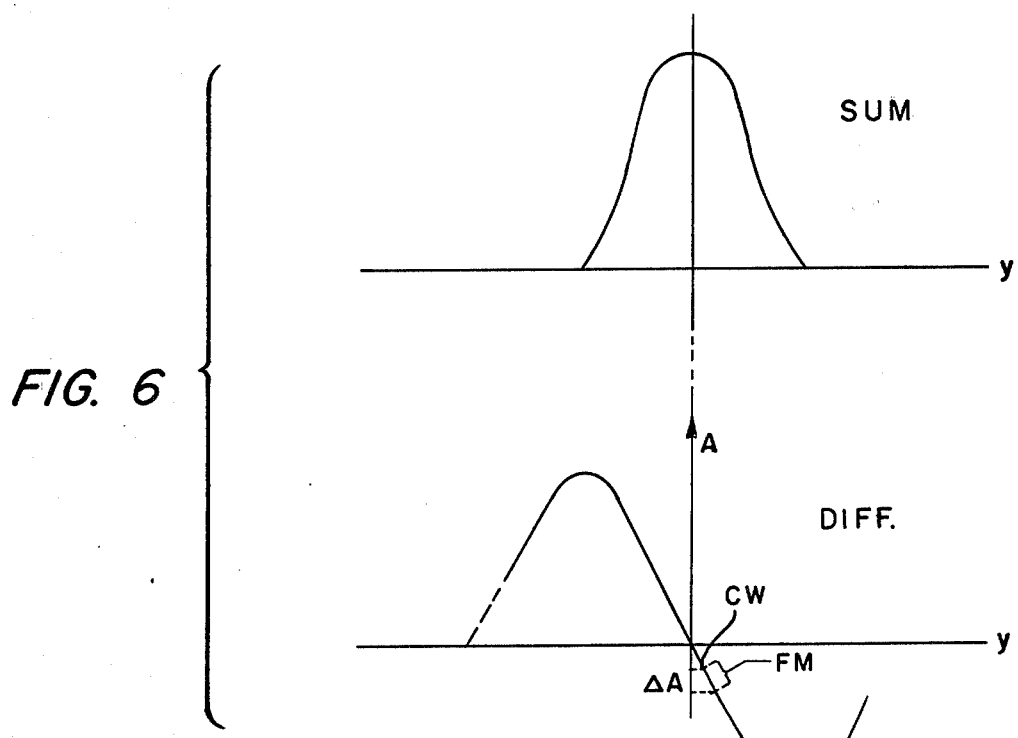
FIG. 6 shows graphs of the signals of the sum and difference channels in the system of FIG. 1.

A plot of equation 6 for different values of $\theta_1$ is depicted in FIG. 5 as a function of $\theta_2$ with $f_1$ and $f_2$ held constant. The directivity pattern of FIG. 5 is seen to broaden with increasing the values of $\theta_1$. For any one set of values for $\theta_1$ and $\theta_2$, the amplitude of the sum signal varies also with variations in $f_2$ as is seen in equation 6. A plot of the sum signal of equation 8 in the upper graph of FIG. 6 presents the sum signal as a function of y, a single variable, as contrasted to the multi-variable case of equation 6 and FIG. 5. In the ensuing description it will be convenient to utilize equations 7 and 8 since the pattern of the sum signal is invariant in terms of y.

The difference signal for a radar system, such as the system 20 of FIG. 1, is obtained by subtracting the signals of the elements on one-half of the antenna 22 from the signals of the elements on the other half of the antenna 22. As described in "Handbook of Radar Measurement" by D. K. Barton and H. R. Ward, published by Prentice Hall, 1969, pages 18–19, the difference signal may be represented as the derivative of the sum signal in the central portion of the sum signal pattern. The difference signal is plotted in the lower graph of FIG. 6 as a function of y. A key feature of the difference signal is its substantial linearity in the region of small differences between the direction of the target and the direction of the axis of the beam, $\phi_1$, produced by the antenna 22. In the ensuing description the difference signal will be represented by $A = A(f_1, f_2, \theta_1, \theta_2)$, A being a function of the frequencies $f_1$ and $f_2$ and the angles $\theta_1$ and $\theta_2$ as is the sum signal of equation 6.

By inspection of equation 6 and the linearity of the central region of the difference signal of FIG. 6, it is seen that a small change in the magnitude of the difference signal $\Delta A$ may be expressed in terms of the derivative with respect to y and in terms of $f_2$ by $$\Delta A = (dA/dy)\Delta y = -K(f_2 = f_1) \quad (9)$$

where K is constant in respect to frequency, but is dependent on the setting of the phase shifters 34 of FIG. 1. $\Delta y$ is obtained from equation 7 as $$\Delta y = y(f_2 \neq f_1) - y(f_2 = f_1) = \left(\frac{D}{\lambda_1}\right)\left(\frac{f_2}{f_1} - 1\right) \sin \theta_2 \quad (10)$$

Substituting equation 10 into equation 9 and solving for K gives $$K = \left(\frac{-1}{f_2 - f_1}\right)\left(\frac{dA}{dy}\right)\left(\frac{D}{\lambda_1}\right)\left(\frac{f_2}{f_1} - 1\right) \sin \theta_2 \quad (11)$$

$$= -\left(\frac{dA}{dy}\right)\left(\frac{D}{C}\right) \sin \theta_2$$

Considering the case wherein $f_1 = f_2$, this corresponding to a CW (continuous wave) transmission, it is apparent that the difference signal is constant for a fixed difference between $\theta_1$ and $\theta_2$. However, in the case wherein the transmitted signal is a frequency modulated (FM) signal and wherein there is a fixed nonzero difference between $\theta_1$ and $\theta_2$, the difference signal $A(f_1, f_2, \theta_1, \theta_2)$ is seen to vary within the linear region of the difference signal graph of FIG. 6. Typical CW and FM cases are shown in FIG. 6. In the FM cases, since the frequency and the response of the antenna 22 vary as a function of time, the amplitude of a pulse of the difference signal varies with time from the leading edge of the pulse to its trailing edge. This is in contradistinction to the CW case wherein the amplitude of a pulse of the difrence signal may be regarded as essentially invariant with time between the leading edge of the pulse and its trailing edge. As a result, a ranging circuit which is sensitive to the shape of a pulse of the difference signal experiences an error in the FM case.

Figure 7:
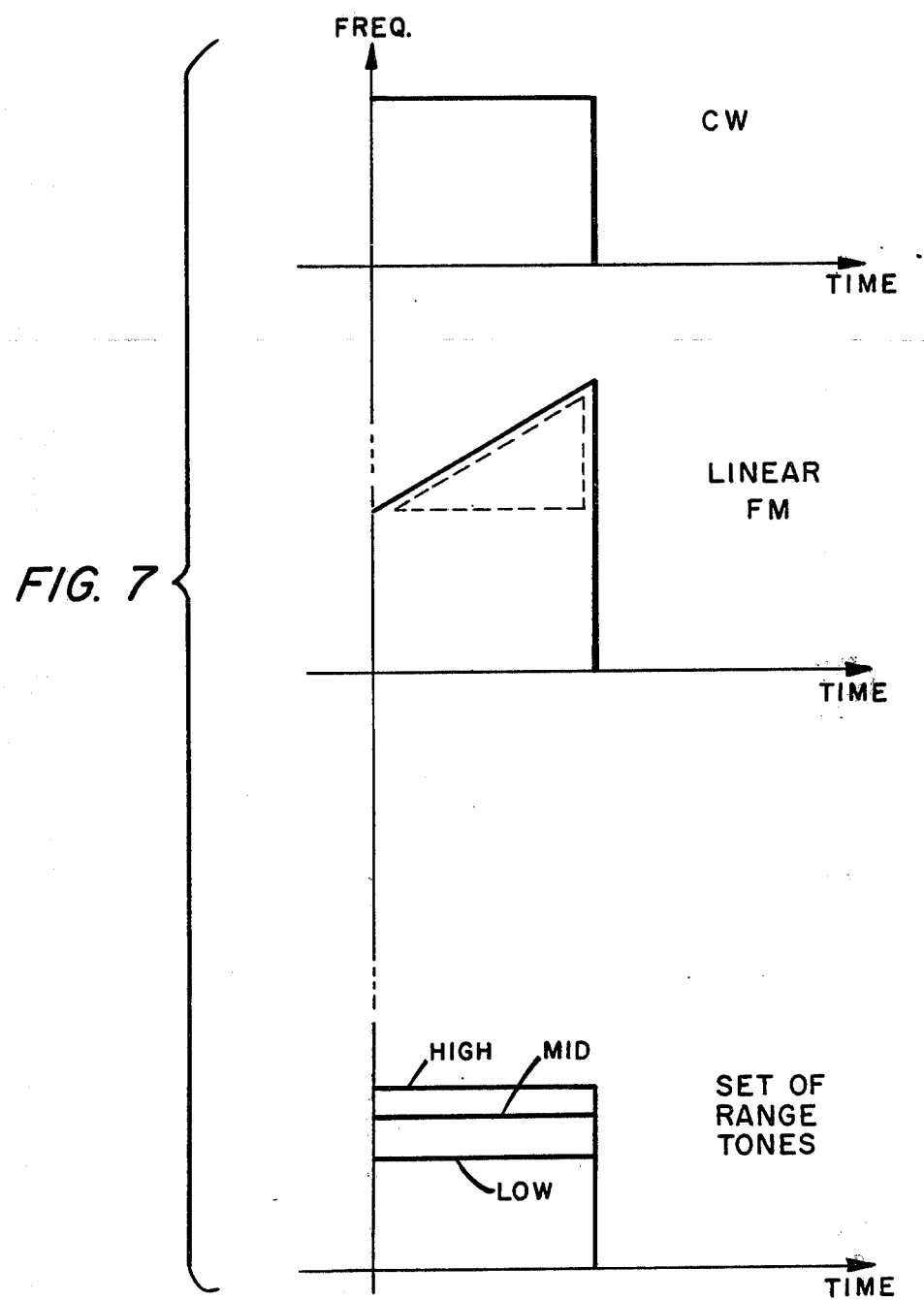
FIG. 7 shows the spectrum of a radiated signal for the system of FIG. 1 as a function time.

FIG. 7 demonstrates the foregoing error in the spectral domain. The upper graph shows a constant value of frequency as a function of time, this corresponding to a transmitted signal without frequency modulation. The middle graph of FIG. 7 shows a variation in frequency as a function of time, this corresponding to a signal transmitted with frequency and modulation. The triangular region outlined with the dashed line corresponds to the spectral contribution to the aforementioned error, and is given by Kf where $f = \omega/2\pi$ is frequency along the horizontal axis.

Letting the sum signal by given by s(t) and the Fourier transform thereof be given by S(f), then $j\omega S(f)$ corresponds to the derivative (d/dt) s(t). Introducing the factor $K/(2\pi)$ to both sides of the transform relationship gives $$K\left(\frac{\omega}{2\pi}\right)S(f) \longleftrightarrow -j\left(\frac{K}{2\pi}\right)\frac{d}{dt} s(t) \quad (12)$$

Substituting the expression for K from equation 11 into the transform relationship 12 gives $$KfS(f) \longleftrightarrow j\frac{dA}{dy}\left(\frac{D}{2\pi c}\right)(\sin \theta_2)\frac{d}{dt} s(t) \quad (13)$$

The left side of the transform relationship 13 corresponds to the spectral form of the error depicted by the aforementioned triangular region in the lower graph of FIG. 7. The relationship 13 also supplies to the situation wherein a number of frequencies are simultaneously present such as the set of three ranging tones (high, midband, low) depicted in the bottom graph of FIG. 7. The right side of relationship 13 is thus the error compensating, or correction, term which is to be subtracted from A(t) to remove the error. This correction term is also seen in FIG. 2 wherein, as has been described previously, the correction term is developed and subtracted from the signal of the difference channel. Thereafter, the corrected difference signal, along with the sum signal are applied to the angle tracker 66 of FIG. 1 wherein the difference signal is normalized by division by the sum signal to produce an angle error signal which is independent of variations in target echo magnitude.

Returning to equations 2 and 3, it is noted that $\theta_2$, the angle of the incident wavefront, is also the azimuth or elevation angle of a target from which the wavefront has been reflected. Accordingly, $\theta_2$ is constant for a fixed position of the target while $\Psi_a$, the phase shift induced by the wavefront, may vary as in the case of frequency modulation of the transmitted signal, or may be multiple-valued as in the case wherein the transmitted signal comprises a set of range tones. In contrast, $\Psi_b$, the phase shift provided by the phase shifters 34 is constant for a fixed setting of the phase shifters 34 while the beam angle $\theta_1$ of the transmitted signal may vary as in the case of the frequency modulation, or may be multiple-valued as in the case of the range tone transmission. The value of $\theta_2$ to be used in the correction term of the relationship 13 is equal to the value of $\theta_1$ at the center frequency $f_0$ of the spectrum of the transmitted signal. Accordingly, the subscript may be dropped in the correction term, with the term being expressed as a function of the angle $\theta$ where $\theta = \theta_1(f_0) = \theta_2$. Similarly, the angle $\theta$ appearing in FIGS. 1 and 2 is presented without a subscript, the beam direction of FIG. 1 being the direction of radiation transmitted at $f_0$.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. In a monopulse radar system incorporating a phased array antenna and a microwave circuit coupled to said antenna for producing sum signals in a sum channel and difference signals in a difference channel to provide a measurement of the angle of orientation of a radar signal incident upon said antenna, a correction circuit coupled to said sum and difference channels for correcting said measurement from effects of a relatively wide bandwidth of said radar signal comprising:

means for differentiating said sum signal with respect to time to provide a derivative thereof;

means for weighting said derivative with a weighting factor proportional to the rate of change of said difference signal with respect to the orientation of said radar signal to provide a weighted derivative; and means for subtracting said weighted derivative from said difference signal to provide a corrected difference signal.

2. A system according to claim 1 wherein said sum channel signal is represented by a complex number having a real part and an imaginary part, and wherein said weighting factor is also proportional to the sine of the angle of orientation of a beam produced by said antenna, said factor being in quadrature with the real part of said sum signal.

3. In a system for measuring the angle of orientation of a beam of radiation relative to a phased array antenna, said system providing a sum channel signal and a difference channel signal, a correction circuit comprising:

means for differentiating said sum channel signal to provide a derivative thereof;

means for multiplying said derivative by a factor representing the orientation of said beam and by a factor representing the magnitude of the boresight error slope of said phased array antenna to provide said weighted derivative; and means for subtracting said weighted derivative from said difference signal to provide a corrected difference signal.

4. A system according to claim 3 wherein said derivative is accomplished by the subtraction of one of two serially occurring samples to said sum channel signal from the second of said two serially occurring samples.

* * * * *